Oct. 19, 1954          J. L. MOODY ET AL          2,692,363
                      VARIABLE VOLTAGE MOTOR
Filed Dec. 5, 1949                              3 Sheets-Sheet 1
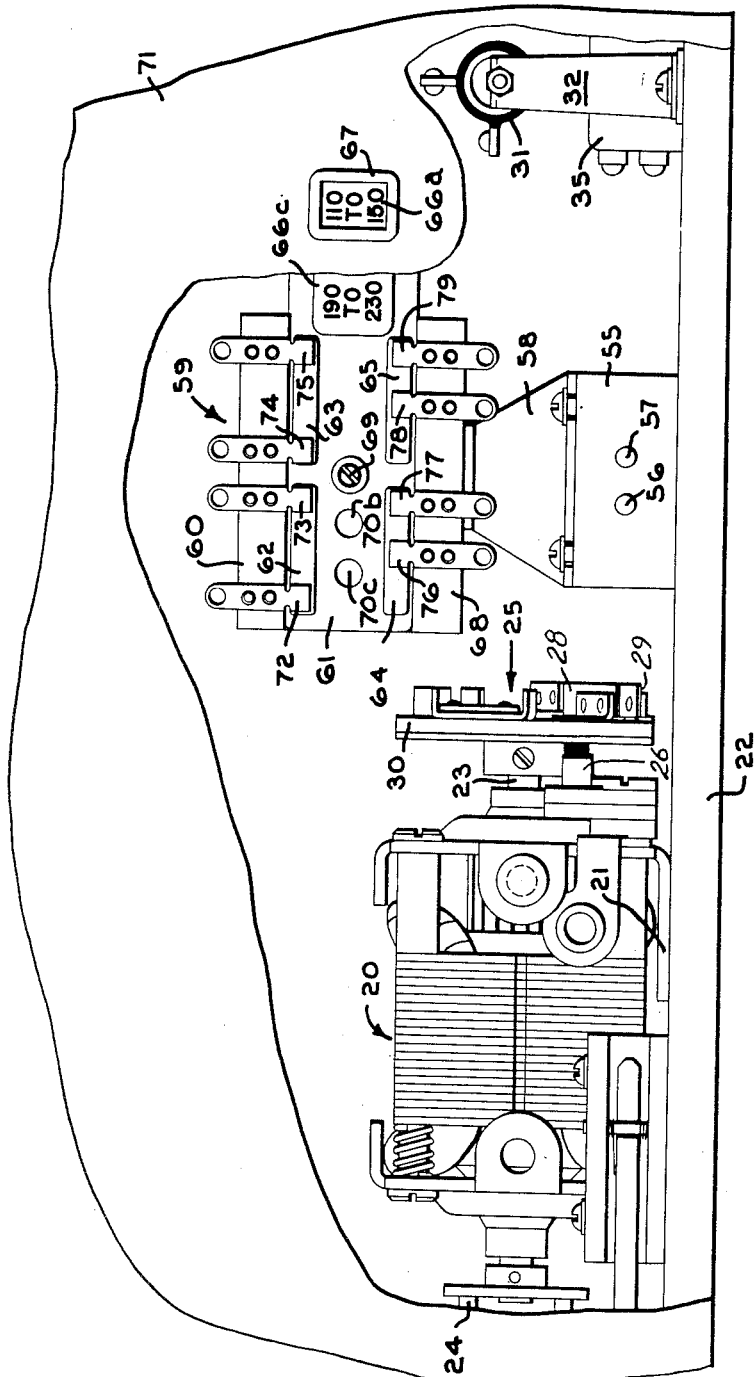
INVENTORS.
JOHN L. MOODY
MORTON P. MATTHEW
BY

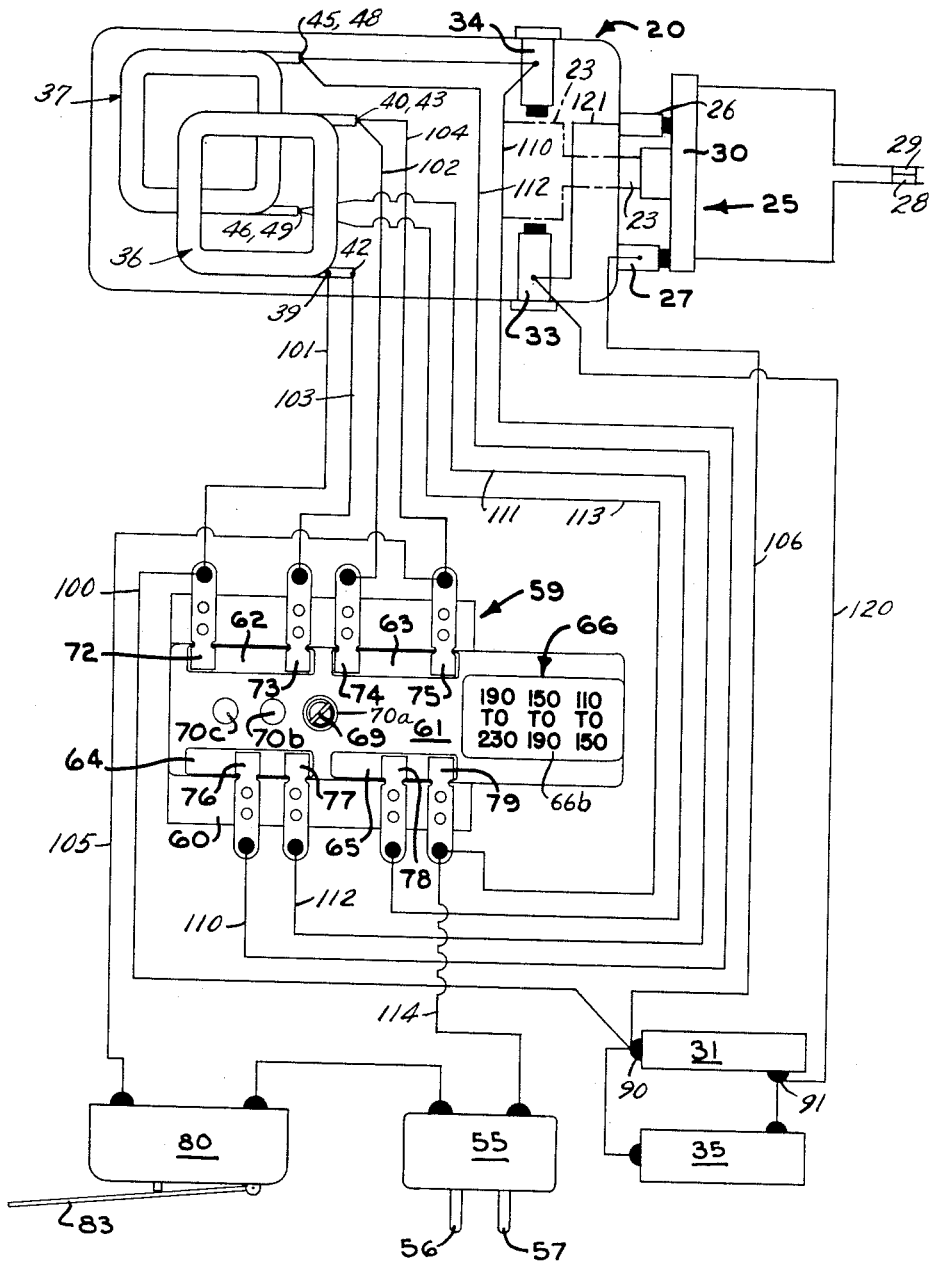

Oct. 19, 1954
J. L. MOODY ET AL
2,692,363
VARIABLE VOLTAGE MOTOR
Filed Dec. 5, 1949
3 Sheets-Sheet 3
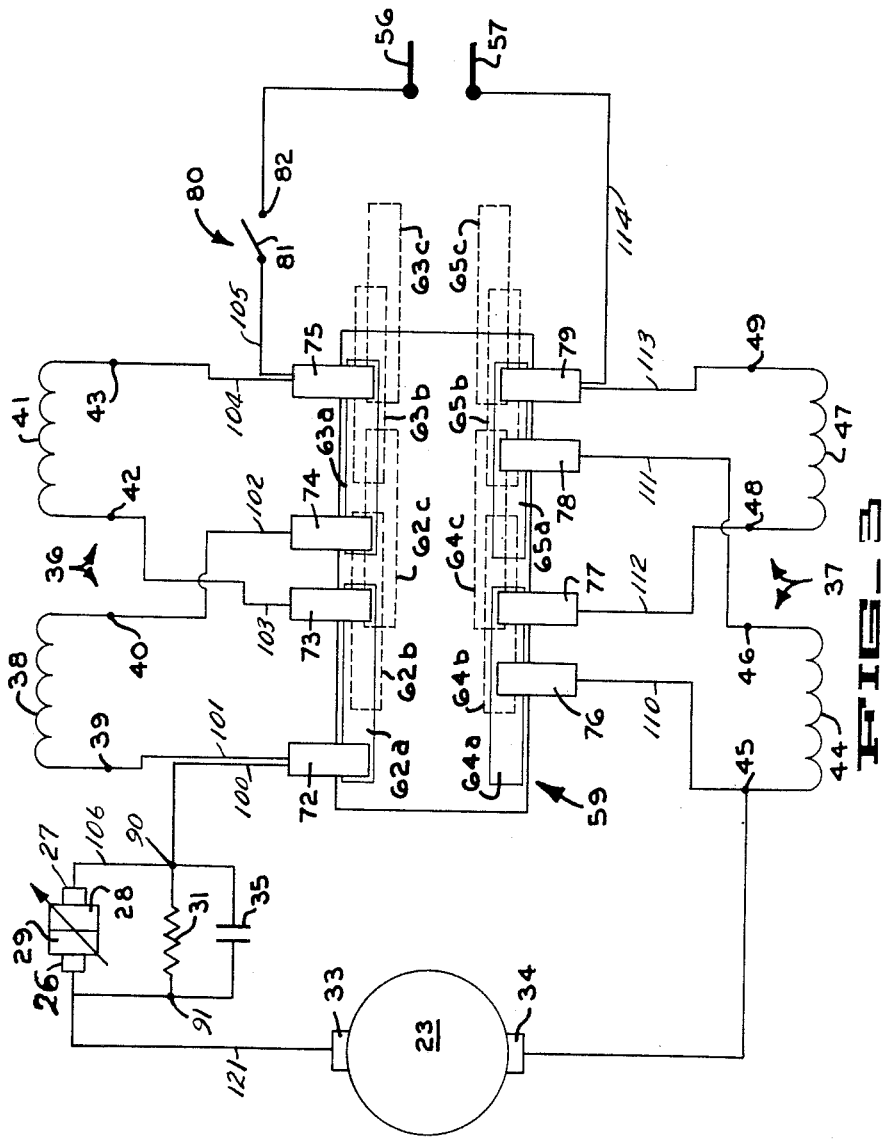
FIG_3
INVENTORS
JOHN L. MOODY
MORTON P. MATTHEW
BY Patented Oct. 19, 1954

2,692,363

UNITED STATES PATENT OFFICE 2,692,363

VARIABLE VOLTAGE MOTOR

John L. Moody, Oakland, and Morton P. Matthew, Berkeley, Calif., assignors to Friden Calculating Machine Co., Inc., a corporation of California Application December 5, 1949, Serial No. 131,088

4 Claims. (Cl. 318—252)

This invention relates to variable voltage motors for calculating machines and the like, and more particularly to a method and means of quickly and easily applying any one of a plurality of predetermined line voltages to the field coils thereof.

It is an important object of the instant invention to provide a method and means of alterably connecting the field coils in an electric motor in such a manner that any one of a plurality of predetermined line voltages may be applied thereto without removing any of the field coil turns from the circuit.

It is another object of the present invention to provide a method and means of quickly and easily changing the field coil connections in an electric motor to conform to any one of a plurality of predetermined line voltage ranges, while at the same time maintaining all field coils turns in the electrical circuit for all such ranges.

It is also an object of the invention to produce a highly compact and easily adjusted switching arrangement for an electric motor having sectionalized field coils on each pole piece thereof wherein all field coil turns are utilized whenever voltages of high, low, and intermediate values corresponding to predetermined line voltage ranges are applied to the input terminals of the motor.

It is still another object of the present invention to produce a compact and linearly adjustable electrical switching arrangement which is of simplified design and is selectively operable to connect the sectionalized field coil windings of an electric motor in series, in parallel, or in a predetermined series parallel relationship, depending upon which of a plurality of predetermined line voltages is to be applied to the input terminals of the motor.

It is also an object of the present invention to produce an electric motor having multiple-section field coils on each pole piece thereof and provided with a compact and easily installed differentially positionable switch adapted to be readily adjusted without the use of special tools for alterably connecting the field coils of the motor in such a manner that any one of a plurality of predetermined line voltages may be applied to the motor input terminals.

Further objects are to provide a construction of maximum simplicity, economy, and ease of assembly and disassembly, also such further objects, advantages, and capabilities as will fully appear and as are inherently possessed by the device and the invention described herein.

The invention further resides in the combination, construction, and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof, or the scope of the appended claims.

Referring to the drawings:

Fig. 1 is a side elevational view of an electric motor for driving a calculating machine or the like, showing a means for quickly and easily altering the field coil connections of the motor.

Fig. 2 is a schematic wiring diagram of the arrangement illustrated in Fig. 1.

Fig. 3 is similar to Fig. 2, but shows three predetermined positions of the variable voltage adjusting device.

Referring now more particularly to the drawings in which like reference numerals indicate like parts in the several views, there is shown generally at 20 an electric motor for operating an automatic calculator or similar business machine, which motor has a frame 21 removably secured to a machine base 22. Motor 20 preferably is of a series type having stationary field coils and a rotating armature 23 adapted to intermittently or continuously drive the machine through the quick disconnect self-aligning coupling 24, which armature preferably is prevented from rotating at speeds above a predetermined maximum by the speed-limiting action of a centrifugal governor 25 which also rotates with the armature shaft. Although a commutator-type series motor is often preferable because such a motor can be conveniently operated on either direct or alternating current and possesses high starting torque and other desirable operating characteristics, in some business machine applications it will be found that shunt-wound, compound-wound, or other known types of electric motors may also function satisfactorily, in which case the centrifugal governor 25 may often be dispensed with.

Whenever the series-connected motor 20 is used, however, a centrifugal governor 25 of conventional design effectively prevents the armature 23 from rotating at abnormally high speeds under no load or light load conditions. Referring now to Figs. 1, 2, and 3 it will be seen that the governor brush terminals 26 and 27 of centrifugal switch, or governor, 25 supply current through suitable slip rings to the normally closed switch contacts 28 and 29 mounted on the electrically non-conductive rotating disk 30. Although contacts 28 and 29 are normally held closed by the resilient pressure of their supporting leaf springs, this resilient pressure is overcome by centrifugal forces induced within governor 25 whenever armature 23 rotates at a speed higher than a predetermined maximum, with the result that contacts 28 and 29 move to their open position until such time as the speed of armature 23 falls below the critical value for which centrifugal switch 25 has been set. As is best shown in Fig. 3, current normally flows from conductor 100, post 90, conductor 106, brush 27, contacts 28 and 29, brush 26, and conductor 121 to motor brush holder 33, and thence to the motor, whenever switch 25 is closed. When contacts 28 and 29 are moved to their open position, however, current flows through a shunt circuit beginning at post 90, through resistor 31, conductors 120, 121. The resistor, as shown in Fig. 1, is supported above base 22 by bracket 32. The resistor has a value adapted to reduce the voltage applied by the motor brushes 33 and 34 to armature 23 sufficiently to cause the rotational speed thereof to fall below a predetermined value and allow the supporting springs to move contacts 28 and 29 to their normally closed position. Condenser 35 is also connected across the terminals 90 and 91 in parallel with resistor 31, which condenser has a capacitance adapted to minimize sparking between switch contacts 28 and 29 during make-and-break movement thereof.

Each pole piece in the laminated frame 21 of the motor has wound thereon a duplex field coil assembly, which dual field coil arrangement is adapted to produce field poles of opposite magnetization whenever current flows through them. In a bipolar motor, for example, as shown in Fig. 3, the upper field coil assembly 36 is composed of a first section 38 having terminals 39 and 40, and a second section 41 having terminals 42 and 43. Both upper coil sections 38 and 41 have substantially an equal number of turns thereon, the number of turns in the sections preferably being selected in such a manner as to efficiently operate the motor at its lowest operating line voltage when connected electrically in parallel, and both coil sections are wound on the associated pole piece in the same direction so that the individual coil sections have a cumulative magnetic effect on the pole piece. In like manner, the lower field coil assembly 37 is composed of a first coil section 44 having terminals 45 and 46, and a second coil section 47 which is provided with terminals 48 and 49.

Differentially positionable means is also provided for easily, quickly, and alterably connecting the individual coil sections which comprise the respective upper and lower field coil assemblies 36 and 37 in such a manner that any one of a plurality of predetermined line voltages may be applied to the motor. An insulated terminal block 55 (Fig. 1) having metallic male power input connectors 56 and 57 extending therethrough is suitably secured to base 22. Block 55 has a right angle bracket extension 58 extending upwardly therefrom so as to form a suitable insulated support for the vertically disposed and easily installed variable voltage adjusting switch 59. Voltage adjusting switch 59 is of a simplified laterally slidable and compact construction, and includes a relatively flat fixed vertical support 60 composed of Micarta, hard rubber, or similar non-conducting material having a longitudinally disposed rectangular slot or groove therein adapted to receive and support a coacting slide 61 of similar nonconducting material for free sliding lateral movement along the coacting ways 68 of the fixed support 60. Slide 61 carries a pair of laterally spaced metallic contactors 62 and 63 longitudinally disposed along the upper edge thereof, and has longitudinally disposed along its lower edge, a similarly spaced pair of electrically conductive connectors 64, 65 which are longitudinally movable with slide 61. Slide 61 also has disposed longitudinally therealong in a position between the upper and lower movable connectors thereof a plurality of equidistantly-spaced holes 70a, 70b, and 70c, each of which is adapted to register with a single hole in fixed support 60, which hole is tapped to receive a locking screw 69 adapted to adjustably secure slide 61 in any one of a plurality of predetermined positions relative to the support 60. The outermost end of slide 61 is also provided with an indicator plate 66 having a plurality of predetermined operating voltage ranges stamped or printed thereon, which ranges are laterally spaced along slide 61 to correspond with the lateral spacing of the holes 70a, 70b, and 70c. Plate 66 is suitably divided into sections in such a manner that only one section at a time can be viewed through the window or aperture 67 in the cover plate or housing 71 of the machine. Thus, when indicator section 66a, labeled with a predetermined lower operating voltage range such as 110 to 150 volts, appears through window 67 as shown in Fig. 1, the lateral displacement of slide 61 along support 60 is determined by the hole 70a. Similarly, the appearance of indicator section 66b bearing the intermediate voltage range 150 to 190 volts through aperture 67 is determined by hole 70b in slide 61, and the appearance through window 67 of the high voltage section 66c, labeled 190 to 230 volts, indicates that switch 59 is in its highest voltage adjusting position, wherein slide 61 is secured to support 60 by inserting screw 69 through hole 70c.

Laterally spaced apart at predetermined intervals along the upper edge of switch support 60, and secured thereto by rivets or other suitable attaching means, is a plurality of stationary leaf spring contacts 72, 73, 74 and 75 composed of Phosphor bronze or similar electrically conductive material, each such contact having an inwardly extending free end adapted to extend over and be resiliently held against one of the upper movable connectors so as to form a wiping contact and a good electrical connection therewith. The lateral spacing between contacts 72, 73 and between contacts 74, 75 is slightly less than the length of the respective connectors 62 and 63, but the spacing between contacts 73, 74 is substantially less than the length of these connectors. Contact 72 is connected to brush terminal 27 by conductor 100, post 99, and conductor 106 and also to terminal 39 of upper field winding 38 by conductor 101. The other terminal 40 of upper field winding 38 is connected to contact 74 by conductor 102. Upper field winding 41 has one end 42 connected to contact 73 by conductor 103 and has its other terminal 43 connected to contact 75 by conductor 104. Contact 75 is also connected, by means of conductor 105, to line terminal 56 on block 55 through a micro-switch 80 having normally open contacts 81 and 82 (shown in Fig. 5) adapted to be closed by suitable means associated with the switch actuator arm 83.

A plurality of similarly inwardly extending stationary leaf spring contacts 76, 77, 78, and 79 are also affixed to the lower edge of switch support 60 in such a manner as to form a wiping electrical connection with the lower movable connectors 64 and 65 carried by slide 61. The lateral spacing between interior contacts 77, 78 is slightly less than the length of connectors 64 and 65, but the lateral spacing between contacts 76, 77 and between contacts 78, 79 is substantially less than the spacing between the interior contacts 77, 78. Contact 76 is connected to one terminal 45 of lower field coil 44 by conductor 110, the other terminal 46 of which is connected to contact 78 by conductor 111. Lower field coil 47 has one terminal 48 connected to contact 77 by conductor 112 and its other terminal 49 connected to contact 79 by conductor 113, the latter being also connected to line terminal 57 on terminal block 55 by conductor 114.

Operation

Whenever it is desired to operate motor 20 from a low voltage supply, such as a voltage falling in the range 110 to 150 volts, screw 69 is removed and slide 61 is shifted laterally along support 60 to the *a* position (shown in Figs. 1 and 2, and in full lines in Fig. 3) wherein section 66a on the indicator plate is visible through viewing aperture 67 in cover plate 71. Screw 69 is then inserted through hole 70a so as to secure slide 61 in this adjusted position with respect to the switch support 60. Figs. 1 and 2, as well as the solid line positions of the contacts 62, 63, 64 and 65 in Fig. 3, illustrates this *a* position or low voltage adjusted position of slide 61 wherein both sections 38 and 41 of upper coil assembly 36 are electrically connected in parallel, and wherein both sections 44 and 47 of lower coil assembly 37 are similarly connected electrically in parallel.

In order to operate motor 20 from a power supply whose potential falls within a predetermined high voltage range, such as a range 190 to 230 volts, preferably having a magnitude of about twice that of the low voltage range, it is only necessary to remove screw 69 and laterally displace slide 61 outwardly towards the right to the *c* position so that the movable connectors carried by slide 61 assume the outermost dotted line positions 62c, 63c, 64c and 65c illustrated in Fig. 3, wherein portion 66c of the indicator plate appears through the viewing aperture 67. Slide 61 is then secured to support 60 in its newly adjusted *c* position by inserting screw 69 through hole 70c, and it will be apparent from Fig. 3 that the upper connectors 62, 63 move with slide 61 to the positions 62c and 63c wherein both upper field coil components 38 and 41 are electrically connected in series. Similarly, the lower connectors 64, 65 move to the positions 64c and 65c wherein they operate to connect both lower field coil components 44 and 47 electrically in series.

A third predetermined or *b* adjusted position of slide 61 is also provided intermediate the low voltage position illustrated in Fig. 1 and the high voltage position shown in Fig. 3. This intermediate *b* position is obtained by moving slide 61 so that section 66b of the indicator plate, labeled 150 to 190 volts, appears through window 67. Slide 61 is then secured in the *b* position by inserting screw 69 through hole 70b, and in this intermediate position the upper connectors 62, 63 move to the dotted line positions 62b, 63b shown in Fig. 3 so as to connect the upper field coil components 38 and 41 electrically in series, while the lower connectors 64, 65 carried by slide 61 are simultaneously moved to the positions 64b, 65b, where they operate to connect the lower field coil elements 44 and 47 electrically in parallel.

Thus, it will be seen that a highly compact, readily installed, and easily adjusted circuit switching arrangement is produced wherein a parallel circuit connection is provided within field coil assemblies 36, 37 during low voltage operation, and a series circuit connection is provided internally therein during high voltage operation. For intermediate voltages, the variable voltage adjusting device is also easily moved to an intermediate adjusted position wherein half of the field coil assemblies have their sectionalized windings electrically connected in series while the remaining field coil assemblies have all sectionalized windings electrically connected in parallel.

We claim:

1. A series wound bipolar electric motor having a multicoil field winding, each of the coils of said winding having two separate terminals; and switch means for variously connecting such coils with respect to each other to adapt said motor for use with differing voltage sources of power, said switch means including: a rectangular sheet of insulation, opposed raised edge insulation portions secured to said sheet and forming therewith a channel, spring clip-contacts along and secured to a said portion and overhanging the edges of said portion, the spring clip contacts being in two differently spaced group arrangements, in and extending across such channel an insulating slide adapted to move freely along and in such channel and to be retained therein by the inward overhang of said clip-contacts, releasable holding means extending through said slide and into said rectangular sheet to hold said slide in adjusted position, and conductor bars on and secured to the face of said slide adjacent said clip-contacts for bridging between various of said clip-contacts to effect various connections between said coils as said slide is moved along such channel; and each said terminal of three of said coils secured to a separate one of said clip-contacts, whereby, the fields of said three coils will always be cumulative when said motor is operated, and: for a high voltage source, said three coils will be nonparallel with other coils and will be in series with each other; for an intermediate voltage source, two of said three coils will be connected in parallel with each other and in series with the third coil which will be nonparallel with other coils; and for a low voltage source of power, said three coils will be connected so that each is in parallel with another coil.

2. A series wound bipolar electric motor having two coils on each of said poles to form a field winding, each of the coils of said winding having two separate terminals; and switch means for variously connecting such coils with respect to each other to adapt said motor for use with differing voltage sources of power, said means including: a rectangular sheet of insulation, opposed raised edge insulation portions secured to said sheet and forming therewith a channel, spring clip-contacts along and secured to a said portion and overhanging the edges of said portion, said spring clip contacts being in two differently spaced group arrangements, in and extending across such channel an insulating slide adapted to move freely along and in such channel and to be retained therein by the inward overhang of said clip-contacts, releasable holding means extending through said slide and said rectangular sheet and operating to hold said slide in a selected adjusted position, and conductor bars on and secured to the face of said slide adjacent said clip-contacts for bridging between various of said clip-contacts to effect various connections between said coils as said slide is moved along such channel; and each said terminal of said four coils of said field winding secured to a separate one of said clip-contacts, whereby, the fields of said coils will always be cumulative when said motor is operated, and: for a high voltage source of power, said coils are nonparallel and are in series with each other; for an intermediate voltage source, two of said four coils are connected in parallel with each other and in series with the other two nonparallel coils; and for a low voltage source of power, said four coils are connected so that two of said coils are in parallel with each other and in series with the other two which are connected in parallel with each other.

3. A motor drive system comprising in combination, an apertured casing, a motor supported in said apertured casing, a plurality of field windings in said motor, a switch supported in said casing and operable to selectively change the circuit conditions of the field windings relative one to another, a fixed contact supporting member in said switch, a movable contact supporting member operable for movement relative to said fixed contact supporting member, releasable holding means to adjustably hold said movable contact supporting member in adjusted position relative to said fixed contact supporting member, and indicia on said movable contact supporting member to indicate the voltage range of the instant arrangement of the field coils, said indicia being visible through an aperture in said casing.

4. In a calculating machine, a variable voltage motor drive system comprising, in combination, an apertured casing, a motor supported in said casing, a plurality of field windings in said motor, a switch supported in said casing and operable to be set to selectively connect said field windings in predetermined arrangements to condition said motor for operation at predetermined voltage ranges, a movable member in said switch, said movable member carrying contacts and being movable relative to a fixed member supporting contacts, holding means engageable with said movable and fixed members and operable to hold said movable and fixed members in required relative positions, and groups of indicia on said movable member to indicate the voltage range in which the motor is rendered operable by the instant setting of said switch, said indicia being observable through an aperture in said casing.

References Cited in the file of this patent

UNITED STATES PATENTS

| Number | Name | Date |
|---|---|---|
| 271,175 | Wheeler et al. | Jan. 23, 1883 |
| 390,906 | Ries | Oct. 9, 1888 |
| 433,360 | McLaughlin | July 29, 1890 |
| 638,522 | Rae | Dec. 5, 1899 |
| 765,209 | Storer | July 19, 1904 |
| 1,089,564 | Hull | Mar. 10, 1914 |
| 1,608,613 | Oswald | Nov. 30, 1926 |
| 1,895,096 | Doloukhanoff | Jan. 24, 1933 |
| 2,064,828 | Grohsgal | Dec. 22, 1936 |
| 2,077,904 | Shepard | Apr. 20, 1937 |
| 2,238,696 | Hanley | Apr. 15, 1941 |
| 2,466,900 | Knopp | Apr. 12, 1949 |

FOREIGN PATENTS

| Number | Country | Date |
|---|---|---|
| 569,638 | Germany | Feb. 10, 1933 |